United States Patent [19]
Threlkel

[11] Patent Number: 5,620,592
[45] Date of Patent: Apr. 15, 1997

[54] LOW MACROPORE RESID CONVERSION CATALYST

[75] Inventor: Richard S. Threlkel, El Cerrito, Calif.

[73] Assignee: Chevron U.S.A. Inc., San Francisco, Calif.

[21] Appl. No.: 477,340

[22] Filed: Jun. 7, 1995

Related U.S. Application Data

[63] Continuation-in-part of Ser. No. 282,673, Jul. 29, 1994, abandoned.

[51] Int. Cl.$^6$ ............................. C10G 45/04; C10G 45/60
[52] U.S. Cl. ..................... 208/216 PP; 502/219; 502/220; 502/221; 502/222; 502/313; 502/314
[58] Field of Search ............. 208/216 PP; 502/314, 502/219, 220, 221, 222, 313

[56] References Cited

U.S. PATENT DOCUMENTS

| | | | |
|---|---|---|---|
| 3,769,239 | 10/1973 | Juguin et al. | 252/465 |
| 4,066,574 | 1/1978 | Tamm | 252/439 |
| 4,113,661 | 9/1978 | Tamm | 252/465 |
| 4,278,566 | 7/1981 | Hensley, Jr. et al. | 252/465 |
| 4,341,625 | 7/1982 | Tamm | 208/216 |
| 4,395,329 | 7/1983 | Le Page et al. | 208/251 |
| 4,411,824 | 10/1983 | Chen | 502/323 |
| 4,443,558 | 4/1984 | Gibson | 502/314 |
| 4,460,707 | 7/1984 | Simpson | 502/315 |
| 4,495,308 | 1/1985 | Gibson | 502/355 |
| 4,572,778 | 2/1986 | Ward | 208/89 |
| 4,941,964 | 7/1990 | Dai et al. | 208/216 |
| 4,976,848 | 12/1990 | Johnson | 208/251 |
| 5,047,142 | 9/1991 | Sherwood, Jr. et al. | 208/251 |
| 5,089,463 | 2/1992 | Johnson | 502/313 |
| 5,177,047 | 1/1993 | Threlkel | 502/200 |
| 5,215,955 | 6/1993 | Threlkel | 502/221 |
| 5,223,472 | 6/1993 | Simpson et al. | 502/314 |
| 5,397,456 | 3/1995 | Dai et al. | 208/216 PP |
| 5,399,259 | 3/1995 | Dai et al. | 208/216 PP |

FOREIGN PATENT DOCUMENTS

1584706   2/1981   United Kingdom .

*Primary Examiner*—Michael Lusignan
*Attorney, Agent, or Firm*—Alan W. Klaassen; L. S. Squires

[57] ABSTRACT

A catalyst, and method of preparing and using a catalyst, for the hydrodesulfurization of metal-containing heavy feedstocks, which has improved catalytic life and metals capacity. The catalyst contains Group VIB and Group VIII metals or metal compounds on a support comprising alumina wherein the support has 70 volume percent of its pore volume in pores having a diameter of between 140 and 220 Å.

19 Claims, 2 Drawing Sheets

LOW MACROPORE RESID CONVERSION CATALYST

CROSS-REFERENCE TO RELATED APPLICATIONS

This application is a continuation in part application of U.S. Application Ser. No. 08/282,673, filed Jul. 29, 1994, now abandoned, the entire disclosure of which is incorporated herein by reference.

BACKGROUND OF THE INVENTION

The present invention relates to a method for the preparation of a catalyst carrier, to a hydrocarbon desulfurization catalyst prepared using the carrier, and to a process for hydrodesulfurizing a hydrocarbon feedstock using the aforementioned catalyst. More particularly, it relates to a method for the preparation of a porous catalyst substantially free of macropores (those having diameters above 1000 Å), and containing at least one metal and/or metal compound of Groups VIB and VIII of the elements. Still more particularly, it relates to a catalyst which comprises a predominantly alumina carrier component which is substantially free of macropores, has a particular micropore size distribution, and contains the aforementioned metal and/or metal compounds. It also relates to a hydrocarbon hydrodesulfurization process using the catalyst.

The pressing need for desulfurizing hydrocarbon oils obtained from petroleum processing is well known. When these stocks are combusted as a fuel in the usual manner, the sulfur present in the hydrocarbon becomes a serious pollutant of the atmosphere in the form of sulfur oxide gases.

Typical operating conditions for hydrodesulfurization processes include a reaction zone temperature of 600° F. (316° C.) to 900° F. (482° C.), a pressure of 200 (1480 KPa abs) to 3000 psig (20775 KPa abs), a hydrogen feed rate of 500 to 15,000 SCF per barrel of oil feed (89.1–2672 std m$^3$ H$_2$/m$^3$ oil), and a catalyst such as nickel or cobalt and molybdenum or tungsten on a porous refractory support.

A problem which has been recognized in the case of hydrodesulfurization of heavy oils is that if the heavy oil contains organometallic compounds, the effective catalyst activity tends to decline relatively rapidly, particularly when the impurity is more than about 10 to 20 ppm metals such as dissolved nickel and vanadium. These metallic impurities are said to deposit on the surface and in the pores of the hydrodesulfurization catalyst.

An approach to this problem of metals impurity deactivation of a hydrodesulfurization catalyst has been to alter the pore structure of the catalyst. However, the answer as to what pore structure is best has not been easily obtained, and in fact there remains a conflict in the answer suggested by the prior art. U.S. Pat. Nos. 4,066,574; 4,113,661; and 4,341,625, hereinafter referred to as Tamm '574, Tamm '661, and Tamm '625, the contents of which are incorporated herein by reference as if fully set forth in ipsis verbis, have discussed the conflict in the art and suggested a solution.

Tamm's patents disclose that heavy oil feedstocks containing metals, particularly residuum feedstocks, are hydrodesulfurized using a catalyst prepared by impregnating Group VIB and Group VIII metals or metal compounds into a support comprising alumina wherein the support has at least 70% of its pore volume in pores having a diameter between 80 and 150 Å. An especially outstanding hydrodesulfurization catalyst, in terms of very low deactivation rate, is attained by using an alumina support of the above pore size distribution.

In Tamm '661 the catalyst is prepared by taking a predominantly alpha-alumina monohydrate, sized in the range below 500 microns, and treating it with a particular amount of monobasic acid. The acid and the resulting mixture is then at least partially neutralized by admixing with an aqueous solution of a nitrogen base such as aqueous ammonia. The solution contains 0.6 to 1.2 equivalents of base per equivalent of acid. The treated and neutralized product is converted into a catalyst carrier by shaping as desired, drying, and calcining. Finally, the catalyst support is impregnated with the aforementioned metals.

Further modifications to the pore structure of a catalyst useful for the hydrodesulfurization of heavy oils has been disclosed in U.S. Pat. Nos. 5,177,047 and 5,215,955, hereinafter referred to as Threlkel '047 and Threlkel '955, the contents of which are incorporated herein by reference as if fully set forth in ipsis verbis.

Threlkel '047 discloses that heavy oil feedstocks containing metals are hydrodesulfurized using a catalyst prepared by impregnating Group VIB and Group VIII metals or metal compounds into a support comprising alumina wherein the support has at least 70% of its pore volume in pores having a diameter between 70 and 130 Å. A hydrodesulfurization catalyst having an alumina support of the above pore size distribution has very high hydrodesulfurization activity.

In Threlkel '047 the catalyst is prepared by taking a predominantly alpha-alumina monohydrate and treating it with a particular amount of monobasic acid. The acid and the resulting mixture is then at least partially neutralized by admixing with an aqueous solution of a nitrogen base such as aqueous ammonia. The solution contains 0.2 to 0.5 equivalents of base per equivalent of acid. The treated and neutralized product is converted into a catalyst carrier by shaping as desired, drying, and calcining. Finally, the catalyst support is impregnated with the aforementioned metals.

Threlkel '955 discloses that heavy oil feedstocks containing metals are hydrodesulfurized using a catalyst prepared by impregnating Group VIB and Group VIII metals or metal compounds into a support comprising alumina wherein the support has at least 70% of its pore volume in pores having a diameter between 110 and 190 Å and at least 70% of its pore volume in pores having a diameter between 130 and 200 Å. A hydrodesulfurization catalyst having an alumina support of the above pore size distribution has a very low deactivation rate.

In Threlkel '955 the catalyst is prepared by taking a predominantly alpha-alumina monohydrate and treating it with a particular amount of monobasic acid. The acid and the resulting mixture is then at least partially neutralized by admixing with an aqueous solution of a nitrogen base such as aqueous ammonia. The solution contains 0.6 to 1.0 equivalents of base per equivalent of acid. The treated and neutralized product is converted into a catalyst carrier by shaping as desired, drying, and calcining. Finally, the catalyst support is impregnated with the aforementioned metals.

U.S. Pat. Nos. 4,976,848 and 5,089,463 disclose a hydrodemetalation/hydrodesulfurization catalyst and process which has 5 to 11 percent of its pore volume in the form of macropores having pore diameters greater than 1000 Å.

Conventional catalysts for converting metals-containing feedstocks, having a high metals capacity, are known. Increasing metals capacity is typically accomplished by increasing pore volume and pore size of the catalyst. However, these high metal capacity catalysts have low conversion activity for reactions such as hydrodesulfurization, since the active surface area of the catalyst per volume of the reactor is low. It would be advantageous to have available a catalyst having both higher metal capacity for increased catalyst life during hydrodesulfurization of a metal-containing feed, and have greater conversion activity for a higher reaction rates at a lower temperature, resulting in a better quality product.

SUMMARY OF THE INVENTION

Accordingly, the present invention provides a catalyst support with both improved life and improved activity in the hydrodesulfurization of heavy oils.

The catalyst support is a porous alumina material characterized by a pore structure having a high percentage of large diameter mesopores, with few macropores. The support comprises a particle density less than 1.0 grams per cubic centimeter and a pore volume in the range of about 0.5 to about 1.1 cubic centimeters per gram, wherein at least about 70% of the pore volume is in pores having diameters in the range of 140 Å and 220 Å, less than 5% of the pore volume is in pores having diameters greater than about 500 Å, and less than 2% of the pore volume is in pores having diameters greater than about 1000 Å, the pores of the alumina support having a peak pore diameter greater than 170 Å.

The present invention is further directed to a catalyst for the desulfurization of a heavy oil comprising the alumina support, a Group VIB component selected from the metals, oxides and sulfides of the Group VIB elements; and a Group VIII component selected from the metals, oxides and sulfides of the Group VIII elements. A preferred catalyst of this invention has a pore volume wherein at least about 70% of the pore volume of the catalyst is in pores having diameters in the range of 140 Å and 220 Å, less than 5% of the pore volume of the catalyst is in pores having diameters greater than about 500 Å, and less than 2% of the pore volume of the catalyst is in pores having diameters greater than about 1000 Å, the pores of the catalyst having a peak pore diameter greater than 170 Å.

Further to the invention, a process is provided for hydrodesulfurization of a heavy oil comprising contacting the heavy oil in the presence of hydrogen gas and at hydrodesulfurization conditions with a catalyst comprising an alumina support, a Group VIB component selected from the metals, oxides and sulfides of the Group VIB elements and a Group VIII component selected from the metals, oxides and sulfides of the Group VIII elements, wherein at least about 70% of the pore volume of the catalyst is in pores having diameters in the range of 140 Å and 220 Å, with less than 5% of the pore volume being in pores having diameters greater than about 500 Å, and less than 2% of the pore volume being in pores having diameters greater than about 1000 Å, the pores of the catalyst having a peak pore diameter greater than 170 Å. Preferred hydrodesulfurization conditions include a temperature of 600° F. (316° C.) to 900° F. (482° C.), a pressure of 200 (1480 KPa abs) to 3000 psig (20775 KPa abs), a hydrogen feed rate of 500 to 15,000 SCF per barrel of oil feed (89.1–2672 std $m^3$ $H_2$/$m^3$ oil).

Among other factors, this invention is based on the surprising discovery of a catalyst comprising an alumina support having a pore structure with a higher peak pore diameter than the catalysts available in the art, while maintaining a desirably low level of macropores. Further to the surprise, when compared to catalysts available in the art, the catalyst of the present invention produces a superior vacuum gas oil, i.e., lower nitrogen and sulfur, with both long life and high activity while converting feedstocks of comparatively higher metals content.

DETAILED DESCRIPTION OF PREFERRED EMBODIMENTS OF THE INVENTION

Those familiar with the art related to the present invention will appreciate the full scope of the catalyst and the method summarized above and be able to practice the present invention over its full scope from a detailed description of the principal features of the catalyst and method which follows.

The catalytic process of the present invention is basically directed to residuum feedstocks as opposed to gas-oil feedstocks. Residua typically have greater than 10 ppm metals, whereas gas-oils nearly always have less than 10 pm metals content. Thus, typical feedstocks for the present invention are crude oil atmospheric distillation column bottoms (reduced crude oil or atmospheric column residuum), or vacuum distillation column bottoms (vacuum residua). The metals are believed to be present as organometallic compounds, possibly in porphyrin or chelate-type structures, but the concentrations of metals referred to herein is calculated as parts per million pure metal.

The catalyst of the present invention comprises an alumina support, a Group VIB component and a Group VIII component. Although the term "comprises" (or "comprising") is used throughout this specification, this term is intended to encompass both the terms "consisting essentially of" and "consisting of" in the various aspects and embodiments of the present invention.

The alumina support of this invention is characterized by a pore structure having a high percentage of large diameter mesopores, with few macropores. The pores having a diameter in the mesopore range are further characterized by a large peak pore diameter. "Macropore" is a term of art referring to a pore in the catalyst support having a large diameter relative to the peak pore diameter. As used herein, a macropore is a pore in the catalyst support having a diameter of greater than 1000 Å. "Mesopore" is a term of art referring to a pore in the catalyst support having a diameter in the range of 25 Å to 1000 Å.

Pore volume as described herein is the volume of a liquid which is adsorbed into the pore structure of the sample at saturation vapor pressure, assuming that the adsorbed liquid has the same density as the bulk density of the liquid. The liquid used for this analysis was liquid nitrogen. The nitrogen desorption isotherm method used for determining pore volume of the support and catalyst of this invention is essentially described in ASTM D 4641-88. As used herein, the terms describing pore properties, including pore volume, pore diameter and peak pore diameter, are based on the measurements using the nitrogen desorption isotherm method. Peak pore diameter (alternatively termed "mode pore diameter" for purposes of the present application), as determined by this method, is a volume weighted mean pore diameter, where $$\text{peak pore diameter} = \frac{\Sigma(V_{cor}^i * D_{avg}^i)}{V}$$

where $V_{cor}^i$ is the incremental volume corresponding to the $i^{th}$ average kelvin diameter, $D_{avg}^i$, and V is the measured total pore volume (for 25 Å–1000 Å pores). The method of determining $V_{cor}^i$, $D_{avg}^i$ and V are detailed in ASTM D 4641-88 In determining peak pore diameter, the product $V_{cor}^i * D_{avg}^i$ is summed over all $D_{avg}^i$ between 25 Å and 1000 Å.

The procedure for measuring pore volumes by nitrogen physisorption is further laid out in D. H. Everett and F. S. Stone, *Proceedings of the Tenth Symposium of the Colstrom Research Society*, Bristol, England: Academic Press, March 1958, pp. 109–110.

The alumina support has a pore structure which is characterized by a low amount of macropores and a substantial amount of large mesopores. The porosity of the alumina support may be described as a series of pores, each having a certain diameter, which are an integral part of the support structure. The porosity of the support can be described in a number of ways, including the total pore volume, a range of diameters into which a certain percentage of the pores falls, an average diameter of some or all of the pores, or a peak diameter, as described above. Thus, the alumina support of this invention typically has a peak pore diameter of greater than 170 Å, preferably within the range of 170 Å to 220 Å, more preferably in the range of 180 Å to 220 Å. Preferably, greater than about 70% of the pore volume of the alumina support is in pores having a diameter between 140 Å to 220 Å. More preferably, greater than about 45%, still more preferably greater than about 50% of the pore volume of the alumina support is in pores having diameters between 170 Å and 220 Å. In the most preferred embodiment, greater than about 25%, still more preferably greater than about 35% of the pore volume of the alumina support is in pores having diameters between 180 Å and 220 Å. The total pore volume of the present support, which is the specific volume of the internal pore structure of the support, is in the range of about 0.5 to about 1.1 cm³/g. The surface are of the support is in the range of about 50 m²/g to about 400 m²/g.

While the pore structure of the support is characterized by a large average pore diameter, it is also characterized by a low amount of macropores. Thus, of the total pore volume of the support of this invention less than about 5%, preferably less than 2% and more preferably less than 1% of the pore volume is in pores having diameters greater than about 500 Å, and less than 2%, preferably less than 1%, more preferably less than 0.5% of the pore volume is in pores having diameters greater than about 1000 Å. To further indicate the narrow pore size distribution of the support and the catalyst of this invention, less than 5%, preferably less than 3% and more preferably less than 2% of the pore volume of the support and the catalyst is in pores having diameters greater than about 300 Å. While catalyst supports which cover a range of mode pore diameters are known, the combination of a support having a peak pore diameter greater than 170 Å and less than 2 volume percent of its pore volume being in pores having a diameter above 1000 Å is not known.

Figure 1:
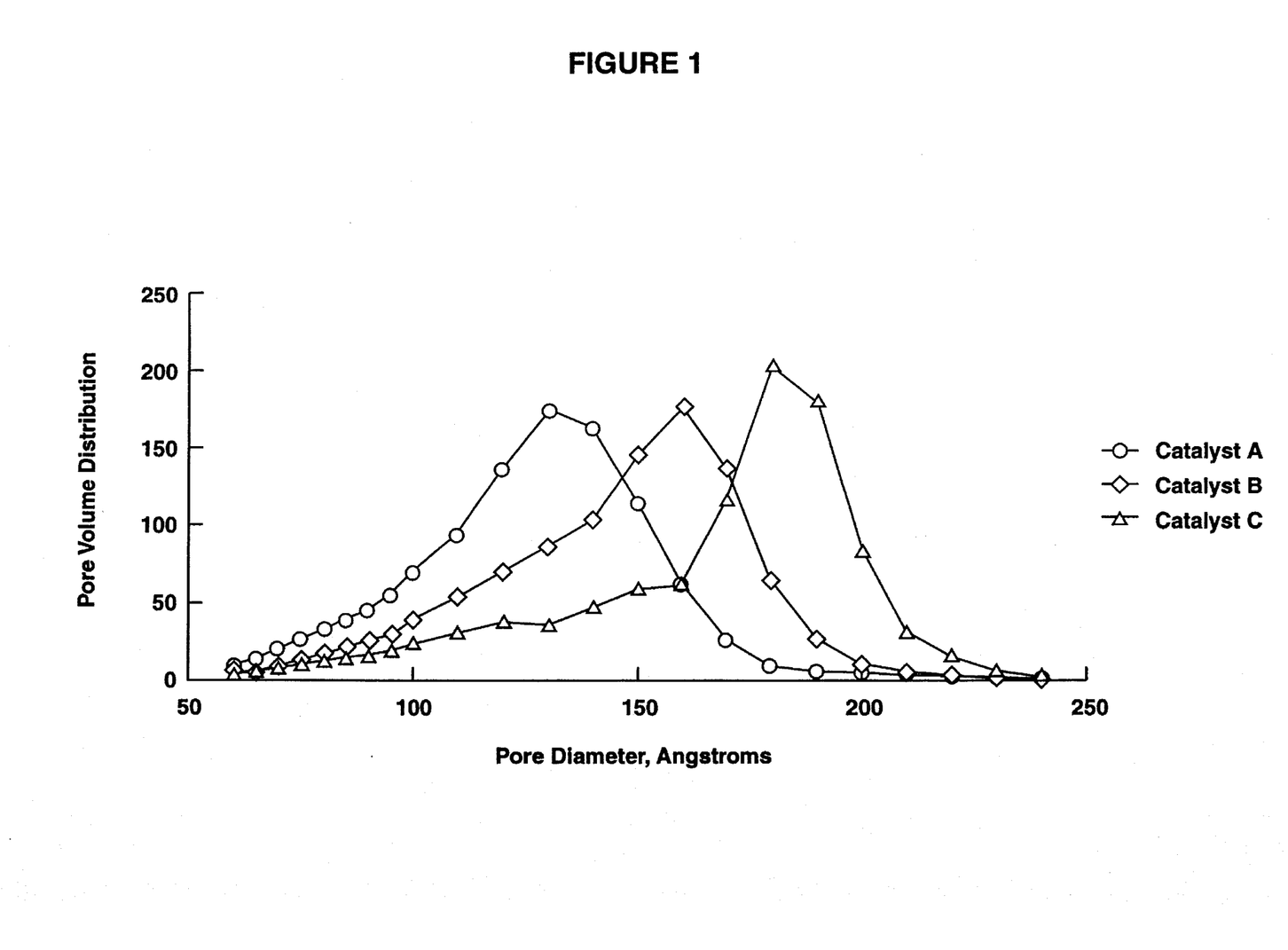
FIG. 1 shows the pore diameter distribution of prior art catalysts and of the catalyst of the present invention.

While the amount of macropores in the present support remains small, the peak pore diameter is larger than that of conventional supports. As shown in FIG. 1, the entire envelope of pore diameters is moved to larger diameters relative to that of conventional supports. Thus, less than 50%, preferably less than 35% and more preferably less than 20% of the pore volume of the support of this invention is in pores having diameters between 70 Å and 130 Å, less than 50% of the pore volume is in pores having diameters between 80 Å and 150 Å. In the most preferred embodiment of the support, less than 65% of the pore volume is in pores having diameters between 110 Å and 190 Å.

Alumina is the preferred support material of the present catalyst, although alumina may be combined with other refractory support materials such as silica or magnesia. The alpha-alumina monohydrate preferably used in the present invention is available from a variety of commercial sources, such as Condea or Vista. A preferred alumina is one having high reactivity, ie. an alumina which quickly forms a gelatinous mass when contacted with an acid. A particularly preferred alpha-alumina monohydrate has a nitric acid gelation (NAG) of less than about 5 minutes, preferably less than about 4 minutes, and more preferably less than 3 minutes. While the NAG value of a particular alpha-alumina monohydrate is known to generally increase over time following manufacture, some alpha-alumina monohydrates have a lower NAG value than others.

The NAG test is conducted as follows:

145 grams (volatiles free) of the alumina is combined in a 400 ml beaker with 329 grams of water and stirred with a Red Devil No. 4042 stirring paddle at 750 rpm until the powder is wetted and well dispersed (at least 3 minutes). 4 grams of concentrated nitric acid are added at once to the beaker while stirring, and stirred for exactly 1 minute. The beaker is removed and immediately placed under a Brookfield Model RVF viscometer using a No. 4 spindle, with the spindle turning before it is immersed in the slurry. The beaker is adjusted so that the spindle is in the center of the beaker, and the height adjusted such that the groove is exactly at liquid level. The NAG value is the time required for the viscosity of the slurry to reach 9500 centipoise to the nearest 0.1 minute from the time at which the acid was first added to the slurry.

The catalyst of the present invention is useful for the hydrodesulfurization of heavy oils, for example oils comprising hydrocarbons having normal boiling points in excess of 900 degrees F., and more typically oils comprising hydrocarbons having normal boiling points in excess of 1000 degrees F. The catalyst comprises the alumina support, and further contains at least one hydrogenation agent, and preferably a combination of two such agents. The metals and/or the compounds of the metals, particularly the sulfides and oxides of Group VIB (especially molybdenum and tungsten) and Group VIII (especially cobalt and nickel) of the elements are in general satisfactory catalytic agents, and are contemplated for use with substantially macropore-free carriers produced by the method of the present invention. The combinations of cobalt, nickel and molybdenum catalytic agents are preferred.

The catalytic agents required for the present catalyst compositions may be incorporated into the calcined carrier by any suitable method, particularly by impregnation procedures ordinarily employed in general in the catalyst preparation art. It has been found that an especially outstanding catalyst is made when the alumina used not only has the pore size distribution required in accordance with the present invention, but also wherein the catalyst is made by a single step impregnation of the alumina using a solution of a cobalt or nickel salt and a heteropolymolybdic acid, for example, phosphomolybdic acid. The most preferred catalyst contains between about 2% and about 4% nickel and between about 8% and about 9% molybdenum. The pore size distribution for the alumina support used to form the finished catalyst is substantially similar to the finished catalyst pore size distribution since there is little change in pore size distribution upon impregnating the support with Group VIB and Group VIII metal compounds. Where differences between catalyst support and catalyst exist, the peak pore diameter of the pores of the catalyst will usually be no more than 5 Å smaller than the peak pore diameter of the pores of the support from which the catalyst is made. Thus, at least about 70 volume percent of the pore volume of the present catalyst is in pores having diameters in the range of 140 Å to 220 Å, preferably at least about 45 volume percent of the pore volume being in pores having diameters in the range of 170 Å to 220 Å. The peak pore diameter of the catalyst is greater than 170 Å, and preferably in the range of 170 Å to 220 Å. Relatively pure alumina is available from several sources as spray-dried, amorphous or crystalline hydrate powders. A particularly preferred alpha-alumina monohydrate for preparing the catalyst of the present process in Catapal SB2 alumina (Condea/Vista). These materials are suitable for extrusion when mixed with water only after the addition of an extrusion aid. Two commonly used aids are a strong mineral acid or a combustible organic lubricant. The former usually leads to high density extrudates and the latter leads to pore size distributions containing substantial micropore volume, neither of which is acceptable in a residuum desulfurization catalyst support in accordance with the present invention. The patents of Tamm and Threlkel, previously incorporated herein, disclose a procedure by which such a material can be used to obtain a moderate to low density alumina having greater than 97%, usually greater than 99%, of its pore volume in the micropore region. That is in the region of pore diameters less than about 500 Å.

In the present invention the process of the Threlkel '955 patent is improved by a specific method of manufacture improvement, which shifts the pore size distribution from 70% of the pore volume being in pores having a diameter of between 110 and 190 Å to a pore size distribution in which 70% of the pore volume is in pores having a diameter of between 140 and 220 Å, and further that the peak pore diameter of the pores is greater than 170 Å, and preferably in the range of 170 Å to 220 Å.

While the choice of a reactive alumina for preparing the support of the present catalyst will generally aid in achieving the desired pore structure for the catalyst, other manufacture methods may be used to further aid in making the present catalyst. In the method of preparing the support, the particulate solid alumina monohydrate is treated with acid (in a process termed "peptization") by mixing the solid with an aqueous acidic solution to a pH preferably in the range of about 3.0 to 4.5. Suitable monobasic acids, preferably nitric acid or its equivalent, eg. hydrochloric, hydrofluoric and hydrobromic acids may be used. The acid treated particulate solid alumina monohydrate is then partially neutralized by admixing into the treated solid an aqueous solution of nitrogen base containing generally in the range from about 0.9 to about 1.1 equivalents of nitrogen base per equivalent of acid. This process is sometimes known as "back-titration".

Thus, a specific method of preparing the alumina support of this invention comprises treating a particulate solid comprising predominantly alpha-alumina monohydrate having a nitric acid gelation value of less than 5 minutes by admixing the solid with an aqueous acidic solution to a pH in the range of about 3.0 to 4.5; neutralizing at least a portion of the admixed acid by admixing into the treated solid an aqueous solution of a nitrogen base containing an amount of base in the range of from about 0.9 to 1.1 equivalents per equivalent of the acid; shaping and drying the neutralized or partially neutralized solid; and calcining the shaped solid at a temperature of at least 1600° F. (871° C.).

By "nitrogen base" as used herein is meant a base of the formula: $R_3$ N and the corresponding hydroxide form, $R_3HNOH$, wherein the R groups are the same or different and are selected from the group consisting of hydrogen and of alkyl groups having a carbon atom content in the range of from 1 to 3, inclusive. Aqueous ammonia is preferred.

The nature of the mixture resulting from the neutralization of the treated alumina varies, depending upon its volatiles content. It may be a flowable solid or a viscous paste. In the preferred form required for use as an extrusion feed, it is a flowable solid having a volatiles content in the range of from 50 to 70 wt. %. The term "volatile" as used herein is the material evolved during the high temperature $\geq 900°$ F. (482° C.) drying. A variety of shaping methods may be employed for forming the precursor of the catalyst carrier from the treated and neutralized solid. Preferably, the shaping is affected by extruding. The catalyst shape and size are chosen so that diffusion limitations and reactor pressure drops are minimized. Preferably, the catalyst size is ¼ inch to 1/100 inch in diameter, more preferably ⅛ inch to 1/40 inch in diameter, although the shape of the catalyst may be in various forms, including cylindrical pellets or spheres, or other shapes. In the production of the finished carrier, the shaped solid is generally treated in drying and calcining steps. The drying step is typically carried out in the range of from about 150° F. to 500° F. (66° C.–260° C.) and following the drying the calcination is carried out in a dry or humid atmosphere, with the final calcination temperature preferably being greater than 1600° F. (871° C.), more preferably in the range of from about 1600° F. to about 1700° F. (871° C.–927° C.)

The present method results in the production of moderate to low density, predominantly alumina, catalyst carriers having preferably greater than about 98% of their pore volume in the micropore region; and in particular, having at least 70% of the total pore volume in pores having a pore diameter in the range between 140 and 220 Å, with preferably at least about 45% of the total pore volume being in pores having pore diameters in the range of 170 Å and 220 Å, and further that the peak pore diameter of the pores is greater than 170 Å, preferably in the range of 170 Å to 220 Å, with less than 5% of the total pore volume being in pores having diameters above 500 Å, and less than 2% of the total pore volume being in pores having diameters above 1000 Å. Table I presents a typical distribution of the pore volume among the pore diameters in a prior art catalyst described by Tamm '661, '574 and '625 Table II presents a typical distribution of the pore volume among the pore diameters in a prior art catalyst described by Threlkel '955. Table III presents a typical distribution of the pore volume among the pore diameters in a prior art catalyst described by Threlkel '047. Table IV presents a typical pore volume distribution among the pore diameters of a catalyst of the present invention.

TABLE I

| PORE DIAMETER (ANG.) | CUM. PORE VOL. (%) | PORE VOL. (EST.) (CC/GM) |
|---|---|---|
| 1000.00 | 0.009 | 0.0001 |
| 900.00 | 0.029 | 0.0002 |
| 800.00 | 0.065 | 0.0005 |
| 700.00 | 0.119 | 0.0010 |
| 600.00 | 0.192 | 0.0015 |
| 500.00 | 0.295 | 0.0024 |
| 400.00 | 0.410 | 0.0033 |
| 300.00 | 0.717 | 0.0058 |
| 250.00 | 1.021 | 0.0082 |
| 240.00 | 1.111 | 0.0090 |
| 230.00 | 1.230 | 0.0099 |
| 220.00 | 1.436 | 0.0116 |
| 210.00 | 1.705 | 0.0137 |
| 200.00 | 2.129 | 0.0172 |
| 190.00 | 2.680 | 0.0216 |
| 180.00 | 3.548 | 0.0286 |
| 170.00 | 6.088 | 0.0491 |
| 160.00 | 12.180 | 0.0982 |
| 150.00 | 23.636 | 0.1905 |
| 140.00 | 39.950 | 0.3220 |
| 130.00 | 57.483 | 0.4634 |
| 120.00 | 71.144 | 0.5735 |
| 110.00 | 80.589 | 0.6496 |
| 100.00 | 87.513 | 0.7054 |
| 95.00 | 90.229 | 0.7273 |
| 90.00 | 92.480 | 0.7455 |
| 85.00 | 94.451 | 0.7614 |
| 80.00 | 96.096 | 0.7746 |
| 75.00 | 97.430 | 0.7854 |
| 70.00 | 98.426 | 0.7934 |
| 65.00 | 99.166 | 0.7994 |
| 60.00 | 99.708 | 0.8038 |
| 55.00 | 100.146 | 0.8073 |
| 50.00 | 100.430 | 0.8096 |
| 45.00 | 100.564 | 0.8107 |
| 40.00 | 100.640 | 0.8113 |
| 35.00 | 100.686 | 0.8116 |
| 30.00 | 100.535 | 0.8104 |
| 25.00 | 100.359 | 0.8090 |

TABLE II

| PORE DIAMETER (ANG.) | CUM. PORE VOL. (%) | PORE VOL. (EST.) (CC/GM) |
|---|---|---|
| 1000.00 | 0.007 | 0.0001 |
| 900.00 | 0.032 | 0.0003 |
| 800.00 | 0.090 | 0.0008 |
| 700.00 | 0.173 | 0.0015 |
| 600.00 | 0.254 | 0.0022 |
| 500.00 | 0.387 | 0.0034 |
| 400.00 | 0.595 | 0.0052 |
| 300.00 | 1.052 | 0.0092 |
| 250.00 | 1.621 | 0.0142 |
| 240.00 | 1.818 | 0.0159 |
| 230.00 | 2.063 | 0.0180 |
| 220.00 | 2.439 | 0.0213 |
| 210.00 | 2.900 | 0.0253 |
| 200.00 | 3.797 | 0.0332 |
| 190.00 | 6.357 | 0.0556 |
| 180.00 | 12.723 | 0.1112 |
| 170.00 | 26.368 | 0.2304 |
| 160.00 | 44.063 | 0.3850 |
| 150.00 | 58.600 | 0.5121 |
| 140.00 | 69.041 | 0.6033 |
| 130.00 | 77.690 | 0.6789 |
| 120.00 | 84.781 | 0.7408 |
| 110.00 | 90.186 | 0.7881 |
| 100.00 | 94.129 | 0.8225 |
| 95.00 | 95.594 | 0.8353 |
| 90.00 | 96.870 | 0.8465 |
| 85.00 | 97.970 | 0.8561 |

TABLE II-continued

| PORE DIAMETER (ANG.) | CUM. PORE VOL. (%) | PORE VOL. (EST.) (CC/GM) |
|---|---|---|
| 80.00 | 98.831 | 0.8636 |
| 75.00 | 99.476 | 0.8692 |
| 70.00 | 99.970 | 0.8736 |
| 65.00 | 100.311 | 0.8765 |
| 60.00 | 100.551 | 0.8786 |
| 55.00 | 100.722 | 0.8801 |
| 50.00 | 100.808 | 0.8809 |
| 45.00 | 100.829 | 0.8811 |
| 40.00 | 100.779 | 0.8806 |
| 35.00 | 100.688 | 0.8798 |
| 30.00 | 100.547 | 0.8786 |
| 25.00 | 100.338 | 0.8768 |

TABLE III

| PORE DIAMETER (ANG.) | CUM. PORE VOL. (%) | PORE VOL. (EST.) (CC/GM) |
|---|---|---|
| 1000.00 | 0.034 | 0.0003 |
| 900.00 | 0.058 | 0.0004 |
| 800.00 | 0.080 | 0.0006 |
| 700.00 | 0.109 | 0.0008 |
| 600.00 | 0.164 | 0.0012 |
| 500.00 | 0.232 | 0.0017 |
| 400.00 | 0.324 | 0.0024 |
| 300.00 | 0.530 | 0.0039 |
| 250.00 | 0.752 | 0.0055 |
| 240.00 | 0.812 | 0.0059 |
| 230.00 | 0.883 | 0.0065 |
| 220.00 | 0.985 | 0.0072 |
| 210.00 | 1.097 | 0.0080 |
| 200.00 | 1.249 | 0.0091 |
| 190.00 | 1.451 | 0.0106 |
| 180.00 | 1.681 | 0.0123 |
| 170.00 | 1.989 | 0.0145 |
| 160.00 | 2.393 | 0.0175 |
| 150.00 | 2.997 | 0.0219 |
| 140.00 | 4.310 | 0.0315 |
| 130.00 | 9.386 | 0.0686 |
| 120.00 | 25.123 | 0.1837 |
| 110.00 | 50.454 | 0.3690 |
| 100.00 | 73.714 | 0.5391 |
| 95.00 | 80.758 | 0.5906 |
| 90.00 | 85.335 | 0.6240 |
| 85.00 | 89.292 | 0.6530 |
| 80.00 | 92.350 | 0.6753 |
| 75.00 | 94.675 | 0.6923 |
| 70.00 | 96.514 | 0.7058 |
| 65.00 | 97.877 | 0.7158 |
| 60.00 | 98.808 | 0.7226 |
| 55.00 | 99.489 | 0.7276 |
| 50.00 | 100.013 | 0.7314 |
| 45.00 | 100.381 | 0.7341 |
| 40.00 | 100.605 | 0.7357 |
| 35.00 | 100.684 | 0.7363 |
| 30.00 | 100.693 | 0.7364 |
| 25.00 | 100.475 | 0.7348 |

TABLE IV

| PORE DIAMETER (ANG.) | CUM. PORE VOL. (%) | PORE VOL. (EST.) (CC/GM) |
|---|---|---|
| 1000.00 | 0.009 | 0.0001 |
| 900.00 | 0.035 | 0.0002 |
| 800.00 | 0.083 | 0.0005 |
| 700.00 | 0.149 | 0.0010 |
| 600.00 | 0.245 | 0.0016 |
| 500.00 | 0.389 | 0.0025 |
| 400.00 | 0.640 | 0.0042 |

TABLE IV-continued

| PORE DIAMETER (ANG.) | CUM. PORE VOL. (%) | PORE VOL. (EST.) (CC/GM) |
|---|---|---|
| 300.00 | 1.256 | 0.0082 |
| 250.00 | 2.230 | 0.0145 |
| 240.00 | 2.715 | 0.0177 |
| 230.00 | 3.537 | 0.0230 |
| 220.00 | 5.440 | 0.0354 |
| 210.00 | 8.948 | 0.0583 |
| 200.00 | 17.255 | 0.1124 |
| 190.00 | 33.531 | 0.2184 |
| 180.00 | 50.098 | 0.3263 |
| 170.00 | 61.524 | 0.4007 |
| 160.00 | 69.119 | 0.4502 |
| 150.00 | 75.451 | 0.4915 |
| 140.00 | 80.927 | 0.5271 |
| 130.00 | 85.370 | 0.5561 |
| 120.00 | 89.052 | 0.5801 |
| 110.00 | 92.113 | 0.6000 |
| 100.00 | 94.667 | 0.6166 |
| 95.00 | 95.772 | 0.6238 |
| 90.00 | 96.749 | 0.6302 |
| 85.00 | 97.611 | 0.6358 |
| 80.00 | 98.342 | 0.6406 |
| 75.00 | 98.950 | 0.6445 |
| 70.00 | 99.432 | 0.6477 |
| 65.00 | 99.803 | 0.6501 |
| 60.00 | 100.065 | 0.6518 |
| 55.00 | 100.241 | 0.6529 |
| 50.00 | 100.330 | 0.6535 |
| 45.00 | 100.338 | 0.6536 |
| 40.00 | 100.273 | 0.6531 |
| 35.00 | 100.195 | 0.6526 |
| 30.00 | 100.111 | 0.6521 |
| 25.00 | 100.027 | 0.6515 |

The hydrocarbon hydrodesulfurization catalysts of the present invention contain at least one hydrogenation agent, and preferably contain a combination of two such agents. The metals and/or the compounds of the metals, particularly the sulfides and oxides of Group VIB (especially molybdenum and tungsten) and Group VIII (especially cobalt and nickel) of the elements are in general satisfactory catalytic agents, and are contemplated for use with substantially macropore-free carriers produced by the method of the present invention. The combinations of cobalt, nickel and molybdenum catalytic agents are preferred. Suitably, the Group VIII metal is present in the catalyst in the range of about 0.1 wt. % to about 5 wt. %, calculated as the metal and based upon the total catalyst weight, and the Group VIB metal is present in an amount within the range of about 4 wt. % to about 20 wt. %, calculated as the metal and based upon the total catalyst weight. The most preferred catalyst contains between about 2% and about 4% nickel and between about 7% and about 9% molybdenum.

The catalytic agents required for the present catalyst compositions may be incorporated into the calcined carrier by any suitable method, particularly by impregnation procedures ordinarily employed in general in the catalyst preparation art. It has been found that an especially outstanding catalyst is made when the alumina used not only has the pore size distribution required in accordance with the present invention, but also wherein the catalyst is made by a single step impregnation of the alumina using a solution of a cobalt or nickel salt and a heteropolymolybdic acid, for example, phosphomolybdic acid.

These and other specific applications of the catalyst and process of the present invention are illustrated in the following examples.

EXAMPLES

Example A

Preparation of the Catalyst Support

An alumina feedstock consisting of 80% Catapal alumina and 20% Versal 250 alumina was peptized with 7.6% nitric acid, and back-neutralized with 45% ammonium hydroxide, 66% volatiles by weight were present. Specifically, 1680 gms of Catapal SB-2 alumina from Condea / Vista (NAG value=1 minute) and 420 gms of Versal 250 alumina (Kaiser/ Laroche) on a volatiles-free basis were maintained at a temperature between 145° F. (63° C.)and 155° F. (68° C.), mixed together with 228 gms of concentrated nitric acid and 1600 gms of deionized water at about 150 cc/min in a blender for 15 minutes or until pasty. 146 gms of concentrated ammonium hydroxide (58 wt. % ammonia hydroxide), was mixed with 1600 gms of deionized water and added to the mixer at the rate of about 150 cc/min. and then mixed for an additional 15 minutes. The volatiles content was 66 wt. %. The paste temperature was 144° F. (62° C.). The paste was extruded in a two-inch extruder, using a 0.039-inch cylindrical die. The extrudate was dried in an oven at 250° F. (121° C.) for two hours, then heated at 400° F. (204° C.) for two additional hours. The dried extrudate was calcined for one hour at 1600° F. (871° C.) and an air rate of 1 cubic foot (0.028 m$^3$) per hour of dry air. The particles had the following properties.

| Particle Volume | 0.864 grams/cc |
|---|---|
| Total Pore Volume | 0.861 cc/gm |
| Surface Area | 151 m$^2$/gm |
| Peak Pore Diameter | 190 Å |

This support material was then impregnated with nickel and molybdenum in the following manner. 49 grams ammonium heptamolybdate (Baker) was dissolved in 96 grams deionized water, to which was added 7 drops of 70 wt % nitric acid. The pH of the resultant solution was 5.37. This solution was acidified with phosphoric acid to a pH of 1.51. 6.6 milliliters of ammonia (29 wt %) were then added, to bring the pH of the clear solution up to 3.6, and 47.71 grams nickel nitrate hexahydrate was added to a final pH of 2.11. The support material as prepared above was impregnated by spraying the molybdenum/nickel solution onto the support. The catalyst was then held at room temperature for one hour and dried at 250° F. (121° C.) for two hours and at 400° F. (204° C.) for six hours. It was then calcined with 20 cubic feet (0.566 m$^3$) per hour of dry air for four hours at 450° F. (232° C.), four hours at 750° F. (399° C.) and five hours at 950° F. (510° C.). The finished catalyst contained 8.50 wt. % molybdenum, 3.02 wt. % nickel, and 1.80 wt. % phosphorous. The peak pore diameter was 180 Å which is larger than the prior art catalyst. The surface area was 166 m$^2$/gm.

FIG. 1 is a pore volume plot, where the pore volume distribution is taken to be the ratio (delta volume/delta diameter). The distribution for Catalyst A, calculated from the data in Table I, represents a typical distribution of the pore volume among the pore diameters in a prior art catalyst described by Tamm '661, '574 and '625. The distribution for Catalyst B, calculated from the data in Table II, represents a typical distribution of the pore volume among the pore diameters in a prior art catalyst described by Threlkel '955. The distribution for Catalyst C, calculated from the data in Table IV, represents a typical pore volume distribution among the pore diameters of a catalyst of the present invention.

Example B

Figure 2:
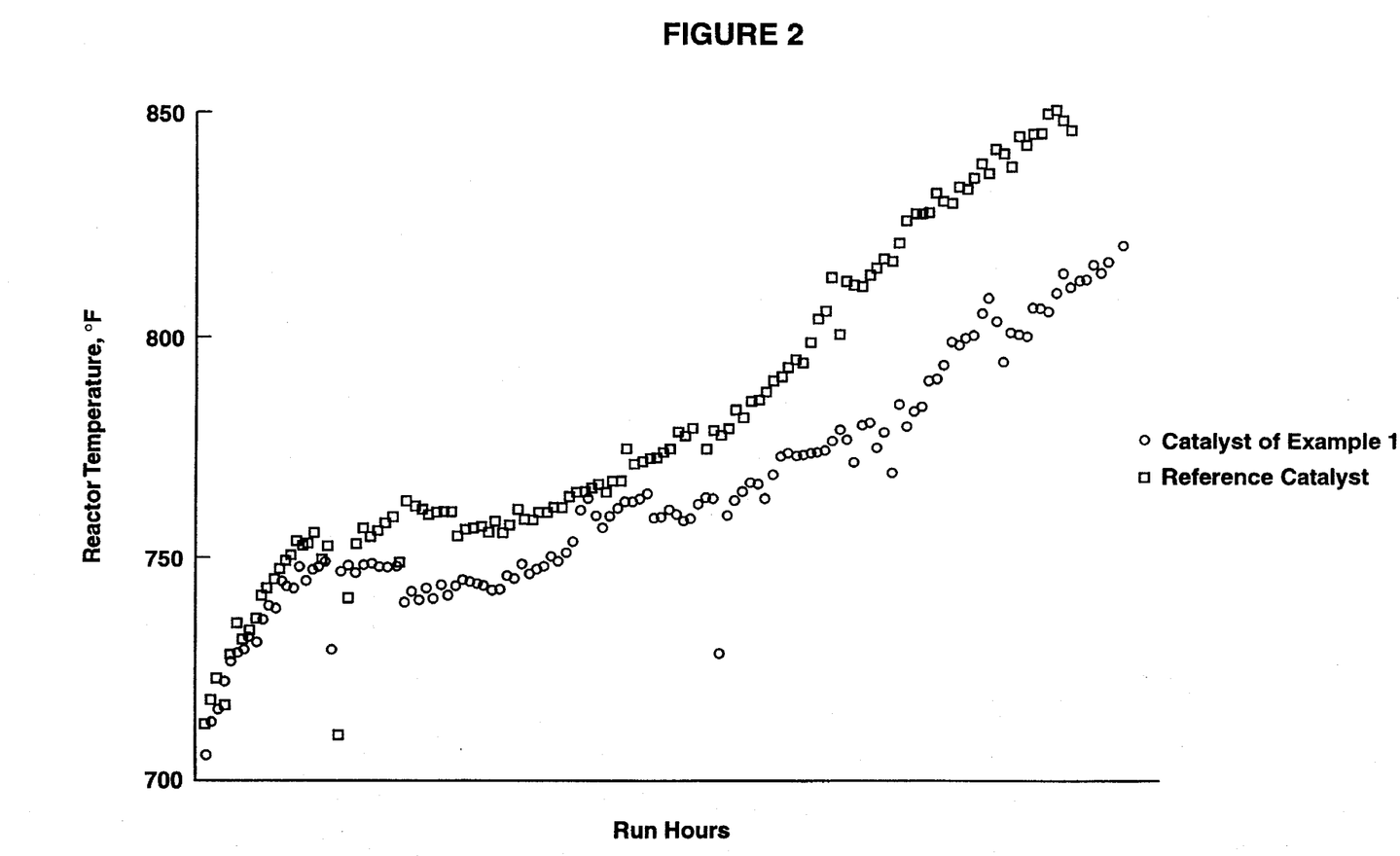
FIG. 2 shows the temperature required to maintain 55% microcarbon residue (MCR) conversion at 0.46 $hr^{-1}$ liquid hourly space velocity (LHSV) feed rate of a blend of one-third by weight Maya atmospheric resid and two-thirds by weight Arab heavy atmospheric resid.

The catalyst of Example A was compared with the analogously prepared catalyst of the prior art (see Table II and FIG. 1—Threlkel '955) in a standard life test. The peak pore diameter of the prior art catalyst was 154 Å. In this test, the conversion catalyst was charged to a reactor under a layer of standard commercial demetalation catalyst, and both catalysts were presulfided using dimethyl disulfide. The layered catalyst system was then contacted with a feed made up of 715° F.+ (379° C.+) blend of 33% Maya and 67% Arabian Heavy residuum which contains 67% 1000° F.+ (538° C.+) residuum at 0.46 LHSV and 2450 psig (16980 KPa abs) total pressure and with a 5000 SCF/bbl recycle hydrogen flow (891 std $m^3$ $H^2/m^3$ oil). The hydrogen partial pressure was maintained above 2000 psig (13880 KPa abs) by use of a controlled bleed stream on the recycle stream. The reaction temperature was controlled to maintain 55% MCR conversion based on MCR content of the feed, where microcarbon residue (MCR) is defined by ASTM D4530-85. The run was considered finished and the catalyst completely fouled when the reaction temperature requirement exceeded 800° F. (427° C.). FIG. 2 shows the temperature required to maintain 55% MCR conversion. The results plotted in FIG. 2 show that the catalyst of this invention performs better than the reference catalyst, both in reaction rate and in useful life. During the early part of the run, the catalyst of this invention was roughly 10° F. more active than the reference catalyst. Having a higher activity means that the reactor can be run at lower severity while maintaining the same conversion as with the reference catalyst run at higher severity. This results in a lower cost operation and in an improved product from the reaction. FIG. 2 also shows that the catalyst of this invention maintained useful activity for roughly 20% longer in a pilot plant test than did the reference catalyst. This extended life is very important for significantly reducing processing costs and for reducing the complications of frequent catalyst change-outs.

There are numerous variations on the present invention which are possible in light of the teachings and examples supporting the present invention. It is therefore understood that within the scope of the following claims, the invention may be practiced otherwise than as specifically described or exemplified herein.

What is claimed is:

1. An alumina support for a hydrodesulfurization catalyst, the support comprising a particle density less than 1.0 grams per cubic centimeter and a pore volume in the range of about 0.5 to about 1.1 cubic centimeters per gram, wherein at least about 70% of the pore volume is in pores having diameters of the range of 140 Å and 220 Å, less than 5% of the pore volume is in pores having diameters greater than about 500 Å, and less than 2% of the pore volume is in pores having diameters greater than about 1000 Å, the pores of the alumina support having a peak pore diameter greater than 170 Å.

2. The support as disclosed in claim 1, wherein at least about 45% of the pore volume is in pores having diameters in the range of 170 Å to 220 Å, the pores of the alumina support having a peak pore diameter in the range of 170 Å to 220 Å.

3. The support as disclosed in claim 1, wherein at least about 25% of the pore volume is in pores having diameters in the range of 180 Å to 220 Å, the pores of the alumina support having a peak pore diameter in the range of 180 Å to 220 Å.

4. The support as disclosed in claim 1, wherein less than about 20% of the pore volume is in pores having diameters between 70 and 130 Å.

5. The support as disclosed in claim 1, wherein less than about 65% of the pore volume is in pores having diameters between 110 and 190 Å.

6. The support as disclosed in claim 1, wherein less than about 2% of the pore volume is in pores having diameters greater than about 500 Å and less than about 1% of the pore volume is in pores having diameters greater than about 1000 Å.

7. The support as disclosed in claim 6, wherein less than about 1% of the pore volume is in pores having diameters greater than about 500 Å and less than about 0.5% of the pore volume is in pores having diameters greater than about 1000 Å.

8. The support as disclosed in claim 3, wherein less than about 1% of the pore volume is in pores having diameters greater than about 500 Å and less than about 0.5% of the pore volume is in pores having diameters greater than about 1000 Å.

9. The support as disclosed in claim 7, wherein less than about 2% of the pore volume is in pores having diameters greater than about 300 Å.

10. The support as disclosed in claim 8, wherein less than about 2% of the pore volume is in pores having diameters greater than about 300 Å.

11. A catalyst for the hydrodesulfurization of heavy oils, comprising the alumina support of claim 1, a Group VIB component selected from the metals, oxides and sulfides of the Group VIB elements; and a Group VIII component selected from the metals, oxides and sulfides of the Group VIII elements.

12. The catalyst as disclosed in claim 11 wherein at least about 70% of the pore volume of the catalyst is in pores having diameters in the range of 140 Å and 220 Å, less than 5% of the pore volume of the catalyst is in pores having diameters greater than about 500 Å, and less than 2% of the pore volume of the catalyst is in pores having diameters greater than about 1000 Å, the pores of the catalyst having a peak pore diameter greater than 170 Å.

13. The catalyst as disclosed in claim 12, wherein at least about 45% of the pore volume of the catalyst is in pores having diameters in the range of 170 Å to 220 Å, the pores of the catalyst having a peak pore diameter in the range of 170 Å to 220 Å.

14. The catalyst as disclosed in claim 11 having a Group VIB component and a Group VIII component selected from the metals, oxides and sulfides of cobalt, nickel and molybdenum.

15. The catalyst as disclosed in claim 14 which contains between about 2% and about 4% nickel and between about 7% and about 9% molybdenum.

16. The catalyst as disclosed in claim 15 which is prepared by impregnating the alumina support with a solution of a cobalt or nickel salt and a heteropolymolybdic acid.

17. The alumina support as disclosed in claim 1 prepared using a method comprising treating a particulate solid comprising predominantly alpha-alumina monohydrate having a nitric acid gelation value of less than 5 minutes by admixing the solid with an aqueous acidic solution to a pH in the range of about 3.0 to 4.5; neutralizing at least a portion of the admixed acid by admixing into the treated solid an aqueous solution of a nitrogen base containing an amount of base in the range of from about 0.9 to 1.1 equivalents per equivalent of the acid; shaping and drying the neutralized or partially neutralized solid; and calcining the shaped solid at a temperature of at least 1600° F. (871° C.).

18. A process for hydrodesulfurization of a heavy oil containing organometallic compounds comprising contacting the heavy oil in the presence of hydrogen gas and at hydrodesulfurization conditions with the catalyst of claim 11.

19. The process as disclosed in claim 18 wherein at least about 45% of the pore volume of the catalyst is in pores having diameters in the range of 170 Å to 220 Å, less than about 1% of the pore volume is in pores having diameters greater than about 500 Å and less than about 0.5% of the pore volume is in pores having diameters greater than about 1000 Å, the pores of the catalyst having a peak pore diameter in the range of 170 Å to 220 Å.

* * * * *